(12) United States Patent
Manchanda et al.

(10) Patent No.: US 8,051,191 B2
(45) Date of Patent: Nov. 1, 2011

(54) ETHERNET EXTENSIBILITY

(75) Inventors: Alok Manchanda, Redmond, WA (US);
Taroon Mandhana, Redmond, WA (US);
Noel W. Anderson, Bellevue, WA (US);
Sharad Mittal, Redmond, WA (US);
Deon C. Brewis, Redmond, WA (US);
Olivier Contant, Redmond, WA (US);
Bernard Aboba, Bellevue, WA (US);
Jerry E. Peterson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/110,790

(22) Filed: Apr. 28, 2008

(65) Prior Publication Data

US 2009/0271518 A1    Oct. 29, 2009

(51) Int. Cl.
*G06F 15/16* (2006.01)
*H04L 12/28* (2006.01)
(52) U.S. Cl. .................. 709/230; 709/227; 370/431
(58) Field of Classification Search .................. 709/227, 709/230; 370/431
See application file for complete search history.

(56) References Cited

U.S. PATENT DOCUMENTS

| | | | |
|---|---|---|---|
| 5,436,902 A | 7/1995 | McNamara et al. | |
| 5,936,963 A | 8/1999 | Saussy | |
| 6,944,587 B2 | 9/2005 | Aronson et al. | |
| 6,977,939 B2 | 12/2005 | Joy et al. | |
| 6,987,961 B1 | 1/2006 | Pothana | |
| 2004/0122651 A1 | 6/2004 | Herle | |
| 2005/0141567 A1 | 6/2005 | Jaber et al. | |
| 2005/0265355 A1 | 12/2005 | Havala et al. | |
| 2006/0203846 A1 | 9/2006 | Davis | |
| 2008/0019501 A1* | 1/2008 | Miller et al. | 379/412 |

OTHER PUBLICATIONS

Davoli, R., "VDE: Virtual Distributed Ethernet," Technical Report UBLCS-2004-12, Department of Computer Science, University of Bologna, Bologna, Italy (Jun. 2004), http://ftp.cs.unibo.it/pub/UBLCS/2004/2004-12.pdf.

* cited by examiner

*Primary Examiner* — Philip Chea
(74) *Attorney, Agent, or Firm* — Wolf, Greenfield & Sacks, P.C.

(57) ABSTRACT

A networked computer with a networking framework that can operate in accordance with a standard protocol or may be configured to perform one or more functions that alter or extend processing according to the standard. The framework includes extensibility points and a mechanism to receive plug-ins that may perform extensibility functions. Network profile information indicates configuration of the extensibility points, including specific extensibility functions to be executed at the extensibility points. This information may be used to configure the extensibility points so that, as the computer operates, the extensibility functions are selectively executed instead of or in addition to standard functions.

20 Claims, 7 Drawing Sheets

ETHERNET EXTENSIBILITY

BACKGROUND

The rapidly evolving networking industry introduces new standards and innovation by independent software vendors (ISVs) and independent hardware vendors (IHVs) at a rate that often outpaces the development schedule of operating system providers. Consequently, when ISVs and IHVs want to implement a new functionality that is not supported by a computer's operating system, they must develop a customized application which typically requires replacing substantial, if not all, portions of existing operating system networking services.

For example, if an ISV wants to implement some security aspect or proprietary extension to the networking software that is unsupported by the operating system, there are several pieces of software that must first be written by the ISV or another third party to enable connectivity by the new device. The ISV must provide a driver to manage the device, connectivity software that runs whenever the device is enabled, and various experience elements, which determine how connection and disconnection will occur, how connection status will be reported, how ISV profiles will be installed and propagated.

SUMMARY OF INVENTION

A networked computer with a networking framework that can operate in accordance with a standard protocol may be configured to perform one or more functions that alter or extend processing according to the standard. The framework includes extensibility points and a mechanism to receive components, such as plug-ins, that may perform extensibility functions. The extensibility functions may be selectively executed at the extensibility points.

To identify which extensibility functions are to be executed, and the points at which they are to be executed, profile information may be provided for each network connection. Network profile information may indicate configuration of the extensibility points, including specific extensibility functions to be executed at each extensibility point. This information may be used to configure the extensibility points so that, as the computer operates, the extensibility functions are selectively executed instead of or in addition to standard functions in the framework.

Accordingly, in one aspect, the invention relates to a computer storage media having computer-executable modules. The modules comprise a profile store for maintaining a profile for each of a plurality of network connections, where at least a portion of the profiles comprise extensibility functions. A plug-in registry may store an identification of extensibility functions provided by networking plug-in components. At least one networking software module may have an extensibility point. During execution by the networking software of a networking operation associated with a connection, the extensibility point selectively initiates action by a networking plug-in component. The networking plug-in may be selected based on information in the profile store for the connection.

In another aspect, the invention relates to a method of operating a computer configured with components to implement a standard protocol to implement a non-standard protocol. The method comprises configuring the computer to implement the non-standard protocol by installing a module for executing at least one function of the non-standard protocol that differs from a function of the standard protocol. A connection profile identifying the at least one networking function associated with the non-standard protocol implemented in the module is also stored on the computer. Information associated with a network connection is processed using the non-standard protocol, using a portion of the components that implement the standard protocol. At a point in the processing within the standard components, information is processed within the module for executing the at least one function.

In a further aspect, the invention relates to a computer system comprising a device and an operating system that has a networking component. The networking component has at least one extensibility point, at least one extensibility interface, and at least one standardized device interface. An adapter for the device interfaces to the operating system through the standardized device interface. A plug-in for implementing a non-standard networking function interfaces to the operating system through the extensibility interface. A profile store identifies operating characteristics of a network connection stores information identifying the device adapter and the plug-in and the at least one extensibility point. In addition, the networking component of the operating system interfaces to the plug-in at the at least one extensibility point during performance of a network operation associated with the connection.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

The Applicants have recognized and appreciated that the costs of requiring ISVs to essentially replace native networking software within a computer in order to customize networking functions can be prohibitive. Monetary costs and costs in terms of developmental delays can stifle the pace of innovation. Moreover, when each ISV provides customized software, there is a negative effect on the overall user experience because there is no consistency between one ISV's implementation and another.

Applicants have appreciated that by providing an extensible networking framework, ISVs can readily add functionality while leveraging the native networking framework. In the following example, a framework is provided in which an ISV may implement Ethernet-like functionality using a networking framework incorporated in the operating system of a networked computer to support Ethernet communications. This framework may selectively execute one or more extensibility functions at defined points within the framework. These extensibility functions may be provided by an ISV as plug-ins or other modules separate from the networking framework. The points in the framework at which extensibility functions are executed may be defined by configuration information that is part of network profiles.

For example, if an ISV wants to implement standards (e.g., IEEE 802.1ae, IEEE 802.1af) or any aspect related to connectivity that are not supported by an operating system, the ISV need not re-create the entire networking software already integrated into the operating software. Instead, with an extensible framework, an ISV may write an extensibility plug-in to incorporate any customizations it may want to provide.

Such an extensible framework also allows the same adapter to provide different operating characteristics in different settings through the use of different plug-ins, which may potentially be provided by different ISVs. The specific plug-in to operate on an adapter is identified through a network profile being used to establish a connection. For example, a consultant moving across enterprises that implement different kinds of network security may use the same computer with a first ISV profile to connect to a network operated by the first enterprise and a second ISV profile to connect to a network operated by the second enterprise.

As such, the extensible framework described herein provides significant flexibility and extensibility in allowing ISVs/IHVs to leverage existing network functionality within a computer's operating system and add early implementations of standards, proprietary extensions, or other customizations at their own pace. As a specific example, a networked computer may be configured to interact with a tethered phone using standard networking software, though customized through the use of plug-ins for that specific application.

Figure 1:
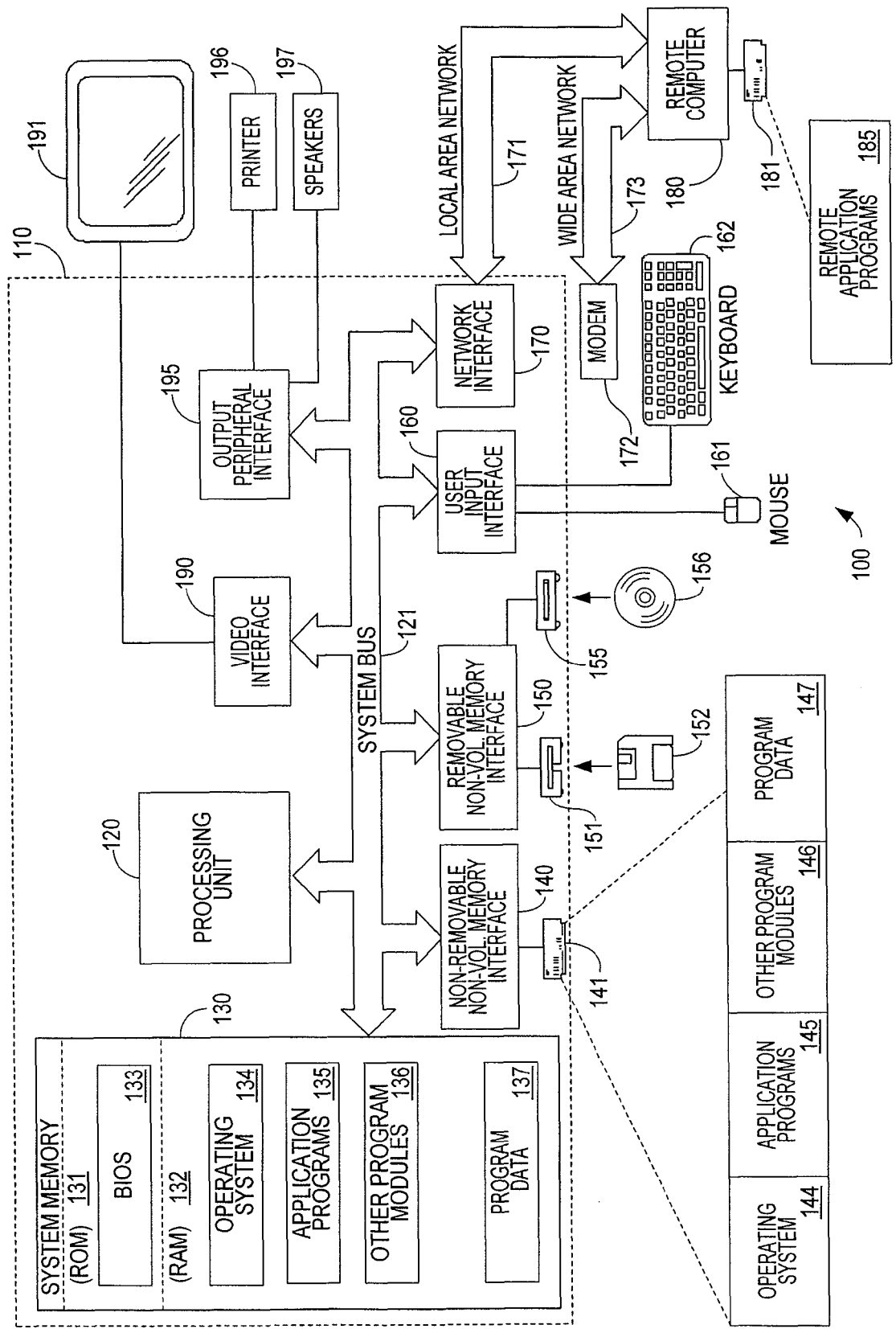
FIG. 1 is a conceptual block diagram of a computer system in which embodiments of the invention may be practiced.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
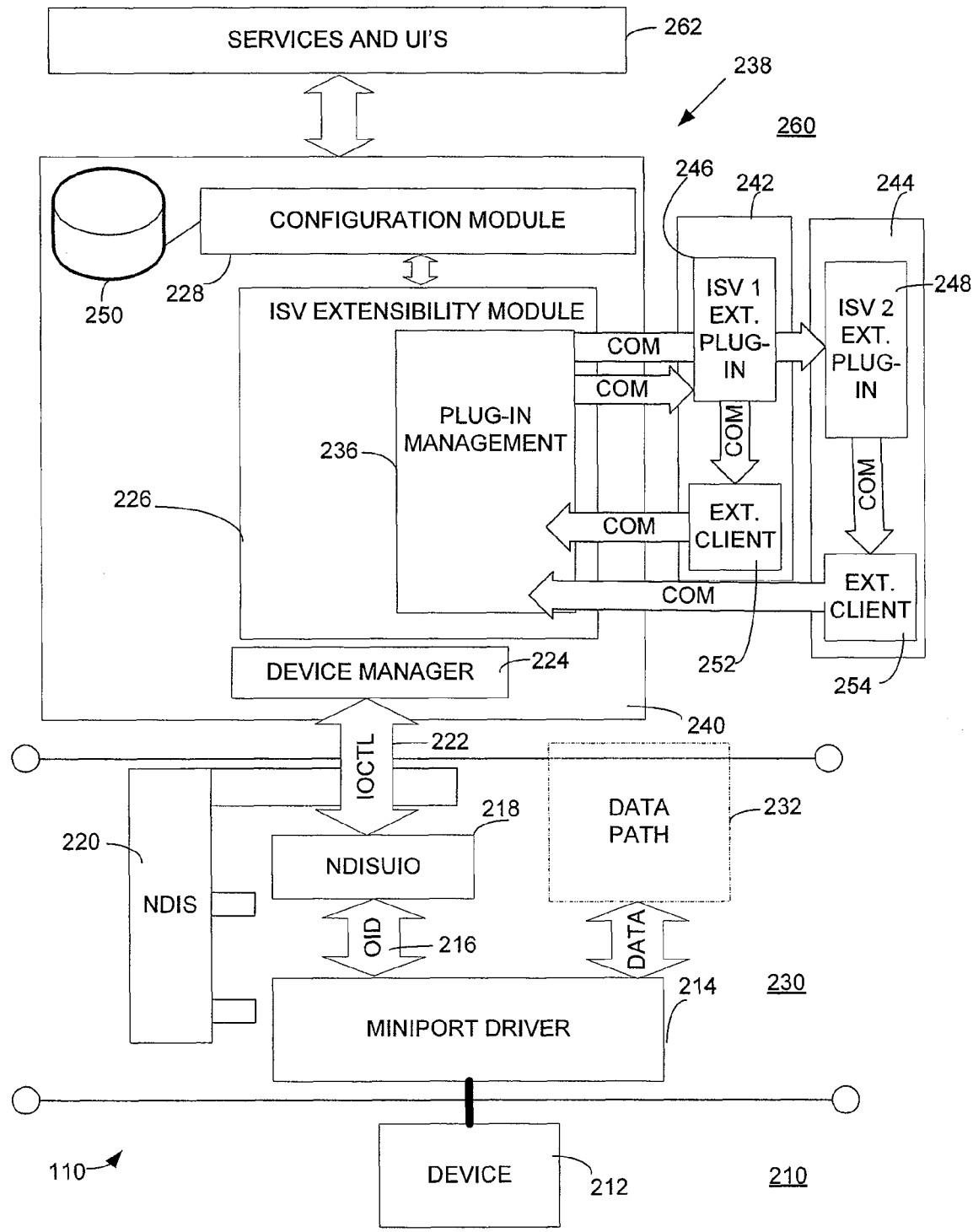
FIGS. 2A, 2B, and 2C are architectural block diagrams of a networking framework in a computer according to embodiments of the invention.
Figure 2B:
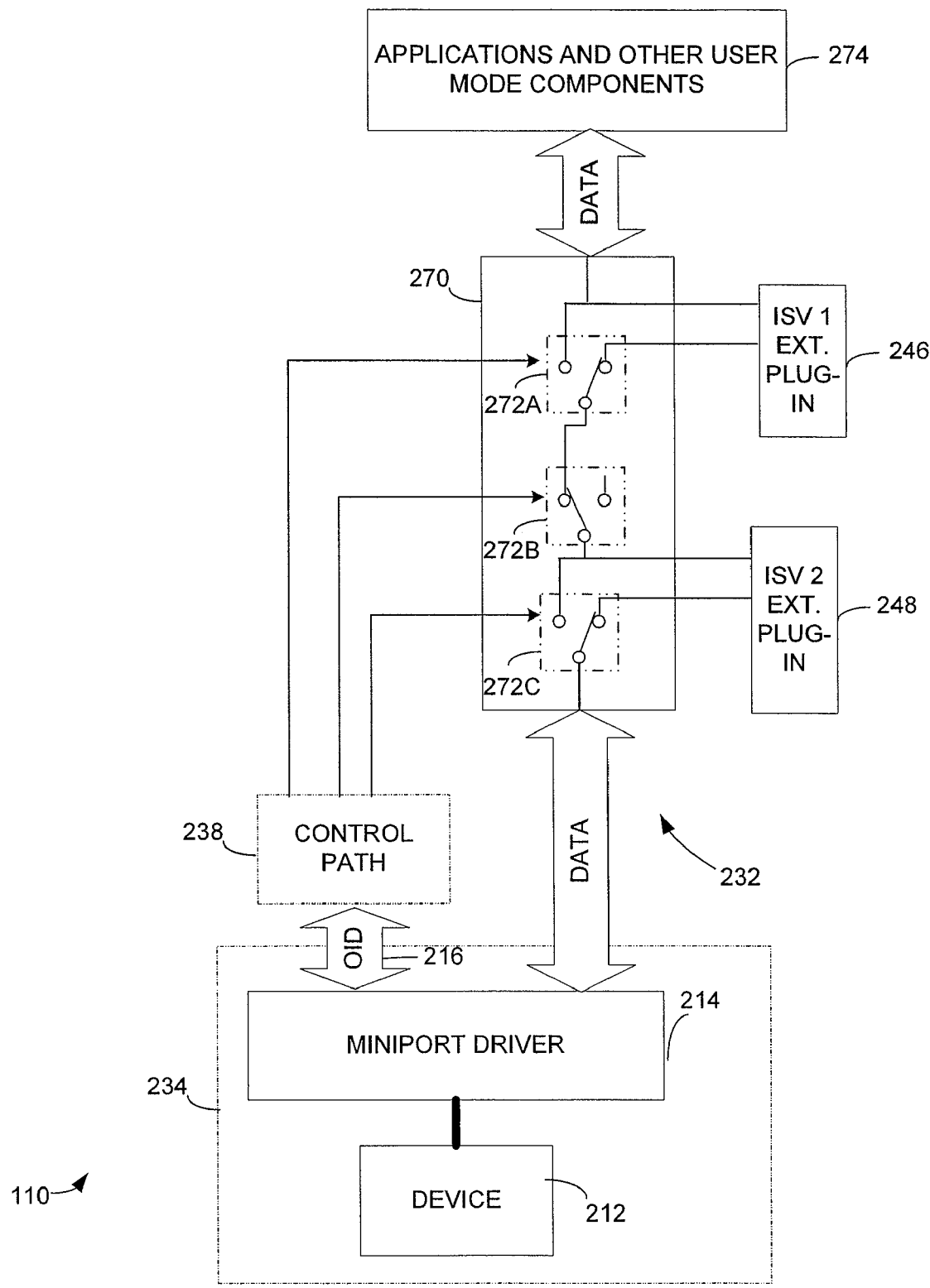
Figure 2C:
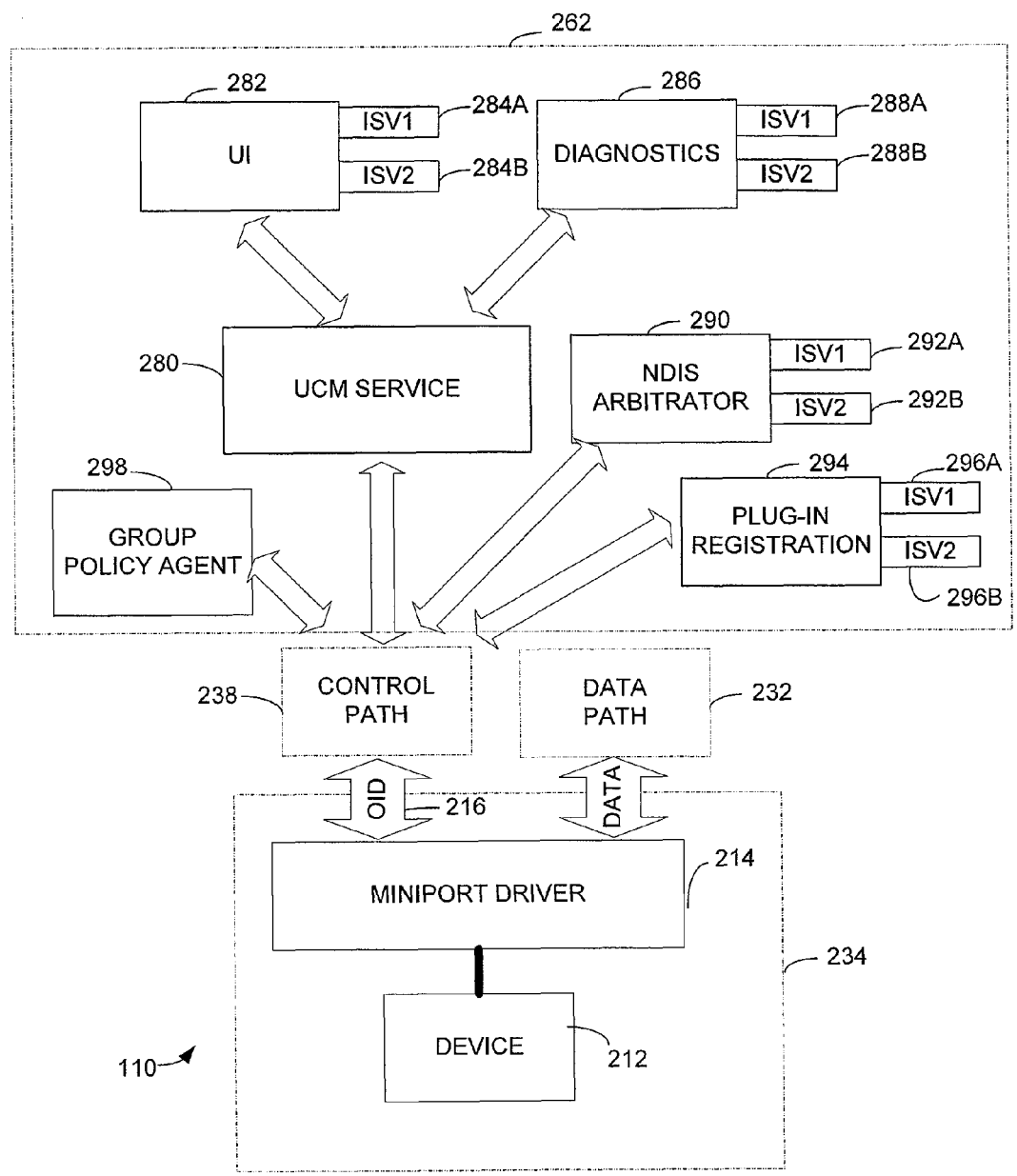

FIGS. 2A, 2B and 2C illustrate components of computer 110, which contain an extensible framework that readily incorporates software components to extend or modify the manner in which computer 110 performs network-related functions. Turning to FIG. 2A, the illustrated architecture is segmented into a hardware mode 210, a kernel mode 230 and a user mode 260. In the example illustrated, components within hardware mode 210 are implemented as hardware components. Components within kernel mode 230 are software components implemented as part of an operating system for a computer. Components within user mode 260 are also software components that may be provided as part of the operating system. However, in contrast to the components in kernel mode that may directly interact with the hardware, the software components within user mode 260 interface with the underlying hardware of a computer through components in kernel mode 230.

FIG. 2A provides an example embodiment only. It is not necessary that software components be separated into a kernel mode and a user mode as illustrated. Further, it is not necessary that components illustrated as being implemented in software be implemented in software or only in software. Some or all of the components could be implemented as programmable logic devices or other suitable hardware components. Similarly, some or all or the functions of components illustrated as being implemented in hardware could alternatively be implemented in software. For example, some or all of the functions performed by hardware devices, such as network interface card (NIC) 212, could be implemented as part of a software module executing in kernel mode 230.

It should be appreciated that any suitable network interfaces may be coupled to computer 110 instead of or in addition to NIC 212, and only one device is illustrated for simplicity. Each such device may operate according to a standard protocol or a non-standard protocol. In this example, computer 110, including NIC 212, is configured for communication using a specific physical layer and a data link layer standard, which is similar to, but not identical to, Ethernet in accordance with IEEE Standard 802.3. Such a protocol make be regarded as an "Ethernet-like" protocol. Because Ethernet is widely used, hardware and software components to implement this standard are readily available and frequently included in computers. Such components may be used to implement some of the functionality of an "Ethernet-like" protocol. Accordingly, the communication framework described herein allows for some functions associated with network communication to be performed using standardized modules and some to be implemented using other modules that provide extensibility functions.

The communication framework illustrated in FIG. 2A implements a data path 232 and a control path 238. The framework interfaces to applications 274 (FIG. 2B) that generate and receive data via data path 232. Some control functions may be initiated automatically by components within control path 238. Other control functions may be initiated by users, applications or other software components that access the communication framework through services and user interfaces 262. Interactions with applications, users and other software components may be performed through interfaces implemented using techniques as known in the art, through any suitable interfaces may be used.

The architecture illustrated in FIG. 2A incudes software components to process data and respond to commands in accordance with the 802.3 standard. However, the architecture of computer 110 is extensible so that functions that are not part of the Ethernet standard may be performed instead of or in addition to functions performed during communication operations in accordance with the Ethernet standard.

Extensibility may be provided through the incorporation of plug-ins 246 and 248, which may be provided separately from the operating system of computer 110 to implement non-standard portions of a protocol. These plug-ins may be supplied by an Independent Software Vendor or may be supplied by an Independent Hardware Vendor (IHV) in conjunction with NIC 212. However, the specific source of the plug-ins is not critical to the invention, and plug-ins from any suitable source may be used.

To integrate functions provided by plug-ins 246 and 248, the framework within computer 110 for performing communications functions may include one or more extensibility points, as described in greater detail below. At each of these extensibility points, a function performed by a component added for extensibility, plug-ins 246 and 248 in this example, may be performed instead of or in addition to a function performed by the framework to support standard communication. Though two different plug-ins are depicted in this example embodiment, one or any suitable number of plug-ins may be used. Moreover, the same plug-in may be used to provide functions at more than one extensibility point, which, for example, may allow one plug-in to provide all extensibility functionality for a communication session.

Functions instead of or in addition to functions executed as part of the communication according to the 802.3 standard may also be performed by NIC 212. With the inclusion of software components, such as plug-ins 246 and 248, NIC 212 can be controlled to perform functions instead of or in addition to those performed in a network interface in accordance with 802.3.

Though the framework may perform functions instead of or in addition to those performed to support communication according to a known protocol, the components may nonetheless be implemented using technology as known in the art to implement an 802.3 network interface. For example, NIC 212 may be implemented as a printed circuit board containing circuitry that plugs into a bus 121 within computer 110. However, a "card" could be implemented in any suitable way. For example various circuitry components could be mounted on a mother board or other assembly within computer 110. Accordingly, the specific implementation of NIC 212 or any other hardware or software components is not a limitation of the present invention.

Regardless of how NIC 212 is implemented, an interface to the device may be provided by an associated miniport driver. For example, NIC miniport driver 214 provides an interface to NIC 212. Miniport driver 214 may be a software component implemented using software coding techniques as are known in the art. Driver 214 may receive commands specifying operations to be performed by NIC 212. In response, miniport driver 214 generates appropriate control signals to the underlying hardware of NIC 212. As with a standard network interface card, commands provided to the driver may cause the underlying hardware or the driver itself to perform an operation associated with communication over a network, configure the hardware or software for communication over a network or may be a request for status information about the hardware, software or network to which NIC 212 is connected. Accordingly, the combined actions of driver 214 and NIC 212 may be regarded as providing an adapter that allows computer 110 to connect to a specific network.

Driver 214 interacts with a component NDISUIO 218 through which commands may be passed. NDISUIO 218 is a protocol driver which allows miniport drivers 214 to interact with other components in computer 110. In the embodiment illustrated, miniport driver 214 includes a standard driver interface. As a specific example, miniport drivers 214 may be configured to communicate according to the NDIS standard, illustrated in FIG. 2A by NDIS component 220. The NDIS standard allows commands to be exchanged as objects, referred to as OIDs, between miniport driver 214 and NDISUIO 218. It should be appreciated that commands may relate to operations to be performed by a device, actions to be taken by the device to configure itself or may be requests for status information, or any other type of commands, and embodiments of the invention are not limited in this respect.

An OID may be associated with a command that specifies a function to be performed by a driver. An OID may be identified by an OID value, which also identifies the function to be performed by a device when the OID is applied to it. Interface standards may include a certain number of pre-defined OIDs, to which devices to be connected to a computer through an interface using that standard may respond.

Some devices that may be controlled through software may be designed to perform functions under software control for which standard OIDs are not defined as part of the NDIS standard. To enable software components to generate commands to cause a device to execute such functions, custom, or private OIDs may be defined. The OID value for a private OID may be specified by the IHV that develops the driver on which the OID is supported. If execution of extensibility functions require an adapter to perform functions for which no standard OID exists, a private OID may be defined so that the adapter can be commanded to perform the desired function.

Private OIDs may be used to implement non-standard interfaces to an adapter. In the example described herein, private OIDs may provide an interface to invoke extensibility functions when no standard OID is appropriate to invoke the extensibility function. Private OIDs may also be used to implement a "discovery interface." In response to such OIDs, the adapter may provide information on extensibility functions implemented in the adapter. Through use of such interfaces, a software component that wishes to invoke a function supported by a device for which there is no standardized command defined may learn that a device that can execute that function is available and can invoke that command. Further, a framework within the operating system can use these interfaces to ensure that a private OID is routed only to the device that is intended to execute the command represented by the OID.

In the example of FIG. 2A, interaction between an adapter and other software components of computer 110 occurs via IOCTL path 222. In this example, those interactions occur with operating system (OS) component 240. In one implementation, OS component 240 may be a connection module, controlling one or more networks to which computer 110 is connected. Some interactions with the adapter may be initiated or processed within component 240. In other instances, component 240 may act as a conduit for communication between a network adapter and other components.

Accordingly, OS component 240 provides a mechanism by which a device and associated driver may receive commands from other components in user mode 260. The commands may be packaged as OIDs by a module in OS component 240 or by some other user mode component. In this example, OS component 240 may be implemented as a software component supporting interfaces with other software components. However, the specific form in which OS component 240 interfaces with other components is not critical to the invention and any suitable types of interface may be used.

In the example illustrated in FIG. 2A, OS component 240 includes a device manager 224, providing functions generally regarded as media access control functions for NIC 212. In one embodiment, device manager 224 may send commands to NDISUIO 218 to the appropriate miniport driver for which the command is intended. For example, the commands may be packaged and sent in the form of one or more OIDs. In addition, device manager 224 may provide any other function related to managing NIC 212 and its associated driver, and embodiments of the invention are not limited in this respect.

OS component 240 may obtain information from other components for sending commands to NIC 212 and its associated driver 214. For example, OS component 240 may include a configuration module 228, and commands may be sent from OS component 240 to configure, for example, miniport driver 214 or other components of the networking framework. In the embodiment illustrated, configuration module 228 may be implemented using techniques as known in the art, except that, in some embodiments of the invention, configuration module 228, as with other portions of the networking framework, may include extensibility points at which extensibility functions may be executed instead of or in addition to functions for configuring an 802.3 network connection.

In some embodiments, information used to generate commands to configure a network adapter may be stored in profile store 250. Profile store 250 may contain information, or "profiles," related to configuration settings for an adapter. This information may be organized based on network or network type so that an adapter may be appropriately configured based on the network to which it is connected. Though a specific example of the organization of information in profile store 250 is provided below in conjunction with FIG. 3, information may be stored in profile store 250 in any suitable way.

Information in profile store 250 may also be generated in any suitable way. For example, a profile for a network may be stored after a successful connection to that network is made. As examples of other approaches for supplying information to profile store 250, network profile information may be entered by a user of computer 110 or may be input by software components installed on computer 110. Also, a group policy agent 298 (FIG. 2C) may provide information stored in profile store 250.

Profile store 250 may be implemented in any suitable way, including as a file or other data structure written to a disk or other non-volatile storage medium within computer 110. It should also be appreciated that profile store 250 may store configuration information from any device installed on computer 110 including NIC 212 or any other device, and embodiments of the invention is not limited in this respect.

In the embodiment illustrated, profile store 250 stores information of the type used in establishing a standardized network connection, such as an 802.3 connection. In addition, to facilitate extensibility, profile store 250 may also store extensibility information. As described in more detail in conjunction with FIG. 3, below, profile store 250 may store information that identifies functions to be performed at one or more extensibility points within networking software. In the embodiment illustrated, these functions may be implemented by invoking functions provided by one or more of the plug-ins 246 or 248. However, the specific implementation of the extensibility functions is not critical to the invention.

A mechanism for interaction between components that implement extensibility functions and other portions of the communication infrastructure may be provided by ISV extensibility module 226. In this example, each plug-in executes in a separate process, created by host components, such as hosts 242 and 244. Host components 242 and 244 may be implemented using techniques as known in the art or in any other suitable way. In this example, ISV extensibility module 226 contains plug-in management module 236 that interfaces with plug-ins 246 and 248 using a known inter-process communication mechanism, such as a COM interface. External client components 252 and 254 may be provided within hosts 242 and 244, respectively, to facilitate communication according to this standard. However, the specific mechanism used for communication is not critical, and any suitable mechanism may be used.

Regardless of the form of interface to plug-ins 246 and 248, this interface may be used to invoke functions that can be performed by plug-ins 246 and 248 or, conversely, for plug-ins 246 and 248 to issue commands to a network adapter or other portions of the networking framework. The interface may also be used to obtain information about the functions supported by plug-ins 246 and 248 and/or the functions that they invoke when executed.

Information passed through the interfaces with plug-ins 246 and 248 may be generated or processed in any suitable way. Commands issued by plug-ins 246 and 248 may be routed by plug-in management module 236 to the appropriate location for execution within the networking framework. For example, a command issued by a plug-in 246 or 248 may be routed by plug-in management module 236 to an appropriate adapter, such by converting the command to an OID that is applied to driver 214 through an appropriate interface.

Extensibility module 226 may also perform other functions associated with extensibility functions. One such function that may be performed by extensibility module 226 is discovering non-standard functions of an adapter connected to computer 110. As described above, in some embodiments, an adapter may present a discovery interface. As each adapter is installed, extensibility module 226 may make a call to the discovery interface of that adapter to determine the functions supported by that adapter.

Consequently, extensibility module 226 provides a mechanism through which the networking framework can collect information about the extensibility functions supported, whether in plug-ins 246 or 248, or in an adapter including NIC 212 and miniport driver 214. This information may be used during operation of computer 110 to determine which extensibility functions can or should be executed.

Though not expressly shown, the networking framework may perform additional functions. These functions may be used in conjunction with network connections that are configured to execute extensibility functions. Though, in some instances, the framework may alternatively be configured to bypass these functions for processing associated with some connections. Examples of these other functions may include error or event logging, driver installation support, and functions related to security protocols.

According to embodiments of the invention, execution of extensibility functions is controlled at one or more extensibility points included within the networking framework. Control may be provided by OS component 240 and/or from within a plug-in accessed at an extensibility point. The extensibility points may be included in any portion of the framework, including within control path 238, data path 232, or services and UI portion 262. FIG. 2B illustrates representative components of the data path 232 of the networking framework, schematically illustrating extensibility points.

FIG. 2B illustrates computer system 110, showing additional detail of data path 232. As in FIG. 2A, adapter 234 contains NIC 212 and miniport driver 214. Adapter 234, for example, may be coupled to an Ethernet-like network. Control functions may be provided in control path 238, containing components as shown in more detail in FIG. 2A. Data sent and received over the network may pass through data path 232.

Data path 232 may be implemented using technology as is known in the art for the data path of a network framework. Though, any suitable mechanism may be used to implement data path 232. Here, data path 232 includes a TCP/IP stack 270. As is known in the art, a miniport driver may notify data received over a network to which NIC 212 is connected to a TCP/IP stack. TCP/IP stack 270 may process that data in accordance with the TCP/IP protocol to route it to an application or other user mode component 274. Likewise, applications and other user mode components 274 may provide data to TCP/IP stack 270, where the data is also processed in accordance with the TCP/IP protocol before being provided to miniport driver 214 for transmission over a network connected to NIC 212. Sending and receiving of data via a TCP/IP stack is known in the art.

As illustrated in FIG. 2B, data path 232 may differ from a conventional network framework data path in that extensibility points may be incorporated into data path 232. In the example of FIG. 2B, three extensibility points, 272A, 272B and 272C, are included. However, the number and placement of the extensibility points is not critical to the invention, and any suitable number and placement of extensibility points may be used.

In the schematic representation of FIG. 2B, each of the extensibility points 272A ... 272C is illustrated as a switch. The switch may be configured to connect plug-ins 246 or 248 into data path 232. Though, each of the switches alternatively may be configured to bypass the plug-ins 246 and 248. When an extensibility point 272A ... 272C is configured to connect a plug-in into data path 232, processing of data reaches the point in data path 232 where the extensibility point is located, and a function provided by the plug-in is executed. Depending on the configuration of the extensibility points, the function of the plug-in may be executed instead of or in addition to a function in data flow path 232.

As illustrated, extensibility point 272A has been configured such that at extensibility point 272A a function from plug-in 246 is executed. Extensibility point 272C is configured such that at extensibility point 272C a function from plug-in 248 is executed. Extensibility point 272B is configured such that at extensibility point 272B no extensibility function is executed. Rather, processing as in a conventional TCP/IP stack is performed at extensibility point 272B. In this way, extensibility functions may be performed at selected locations within data path 232. Whether such functions are performed depends on the configuration of each of the extensibility points 272A ... 272C. If no extensibility functions are desired, extensibility points 272A ... 272C can be configured such that conventional processing is performed within TCP/IP stack 270.

Configuration of each of the extensibility points may be determined by processing within control path 238. In the embodiment illustrated, extensibility module 226 configures extensibility points throughout the network framework based on information provided by configuration module 228 (FIG. 2A). Information provided by configuration module 228 may, for example, indicate that conventional Ethernet processing of data is to be performed within the networking framework. Alternatively, configuration module 228 may specify a configuration in which one or more extensibility functions is performed at defined locations within the networking framework.

More generally, control of the configuration of the networking framework to execute one or more extensibility functions at selected extensibility points may be controlled in any suitable way. However, in this example, configuration of the extensibility points within the networking framework is based on information in profile store 250. As described below in greater detail in conjunction with FIG. 3, profile store 250 may be programmed with information to specify for each of one or more extensibility points an extensibility function to be performed at that extensibility point. Configuration module 228 may read the information from profile store 250 for an active network connection and determine the appropriate configuration of each of the extensibility points in the networking framework. Configuration module 228 may then use any suitable mechanism to cause, at each extensibility point, the appropriate action.

Though FIG. 2B illustrates the extensibility points implemented as switches, this illustration is conceptual. In some embodiments of the invention, the extensibility points may be implemented as software components within other software components of the networking framework. For example, each of the extensibility points, such as extensibility points 272A ... 272C, may be implemented as a procedure call. When processing with data path 232 reaches the extensibility point, that extensibility point procedure may be called. Upon execution, the procedure may access a table or other data structure indicating an appropriate function to be performed at that extensibility point. If the information identifies an extensibility function, that function may be invoked from the extensibility point procedure. However, one of skill in the art will appreciate that there are multiple mechanisms by which a function for execution is dynamically identified, and any suitable mechanism may be used to implement each of the extensibility points.

In the example of FIG. 2B, extensibility points are incorporated into data path 232. Extensibility points may alternatively or additionally be incorporated into control path 238. Extensibility points may be incorporated into control path 238 in the same way that they are incorporated into data path 232. However, any suitable implementation may be used, and different implementations may be used at different points throughout the networking framework.

Turning to FIG. 2C, further detail of the services and user interface components 262 of the networking framework of computer 110 is illustrated. In the embodiment illustrated, services and user interface components 262 may support multiple connections simultaneously. Though, services and user interface components 262 may be structured to support extensibility.

For example, as described above, group policy agent 298 may download into profile store 250 (FIG. 2A) network connection profiles indicating extensibility functions to be performed at specific extensibility points within the networking framework implementing specific connections. Group policy agent 298 may be a software component implemented using mechanisms as known in the art. Group policy agent 298 may access a group policy server or other suitable network location to obtain policy information and store it in policy store 250.

Other components within services and user interface components 262 may store information about extensibility capabilities within computer 110. This information may be used in configuring the networking framework for extensibility. In the example given above in which configuration module 228 (FIG. 2A) configures the networking framework for extensibility, configuration module 228 may access information stored in NDIS arbitrator component 290 and plug-in registration component 294. These components may store information about extensibility functions implemented by adapters or plug-ins, respectively, installed on computer 110. The mechanism by which NDIS arbitrator component 290 and plug-in registration component 294 obtain information about adapters or plug-ins is not critical to the invention. In some embodiments, these components may poll other components of the system to determine which adapters and plug-ins are installed and the functionality supported by the installed components. Such a polling may be triggered by any suitable event, such as start-up of a computer or installation of a new component. Alternatively, such polling may be triggered at periodic intervals or in any other suitable way. In some embodiments, both a registration and a polling mechanism may be used. As one example, extensibility module 226 (FIG. 2A) may poll an adapter used in creating a network connection at the time the network connection is formed. Such a discovery module may ascertain the extensibility functions supported by that adapter and provide information to NDIS arbitrator component 290. In the embodiment illustrated in FIG. 2C, NDIS arbitrator component 290 has associated with it information elements 292A and 292B providing information on extensibility functions supported by adapter 234.

In the embodiment of FIG. 2C, plug-in registration component 294 may receive information based on registration actions taken by each plug-in as the plug-ins are installed in computer 110. With the architecture of FIG. 2A, each plug-in may communicate using COM interfaces to provide information to plug-in registration component 294 concerning extensibility functions implemented by those plug-ins. FIG. 2C illustrates elements 296A and 296B associated with plug-in registration component 294. In this example, data element 296A may contain information about extensibility functions implemented by plug-in 246 and data element 296B may contain data about plug-in 248. However, the specific mechanism by which plug-in registration component 294 organizes and stores information about extensibility functions is not critical to the invention, and any suitable data storage mechanism or organization may be used.

Regardless of the manner in which information relating to installed extensibility functions is obtained and stored, this information may be used when configuring the networking framework to perform extensibility functions. For example, this information may be used to ensure that the networking framework is configured only to perform functions that are supported by installed plug-ins and adapters. Accordingly, during operation, configuration module 228 may access NDIS arbitrator component 290 and plug-in registration component 294 to determine whether extensibility functions identified in profile store 250 may be implemented. If so, configuration module 228 may configure the networking framework of computer 110 to implement those functions. If not, the networking framework may be configured to implement standard networking functions instead.

FIG. 2C also illustrates that computer 110 may include a universal connection manager service 280. Universal connection manager service 280 may act as an interface between the networking framework established for one or more network connections and one or more user mode components. In the example of FIG. 2C, user interface components 282 and diagnostic components 286 are illustrated. Any number of additional or different components may be present and only two such components are illustrated for simplicity. In this example, user interface component 282 displays user interfaces on a display device associated with computer 110 that present to a user information concerning one or more network connections associated with computer 110 or receive inputs from the user concerning those connections. As a specific example, user interface component 282 may present an interface to a user listing all active connections or all networks to which computer 110 is capable of connecting. User interface component 282 may present user interfaces as are known in the art. Additionally, user interface component 282 may be adapted to receive user interface modules associated with extensibility functions. In the example of FIG. 2C, user interface extensibility modules 284A and 284B are illustrated. In this example, the user interface extensibility modules may be supplied in conjunction with plug-ins 246 and 248, respectively. Modules 284A and 284B may render user interfaces through which information may be supplied or received concerning extensibility functions supported by those plug-ins.

Likewise, universal connection manager service 280 is shown to provide an interface to diagnostic module 286. Diagnostic modules 286 may perform diagnostic functions relating to network connections as is known in the art. Additionally, diagnostics module 286 may interface to extensibility modules 288A and 288B that may be provided separately from the networking framework of the operating system of computer 110. Extensibility modules 288A and 288B may be provided by the same independent software vendors that provide plug-ins 246 and 248. These diagnostic modules 288A and 288B may provide diagnostic functions in connection with plug-ins 246 and 248. However, the diagnostic functions provided by modules 288A and 288B may be related to any aspect of the networking framework.

Figure 3:
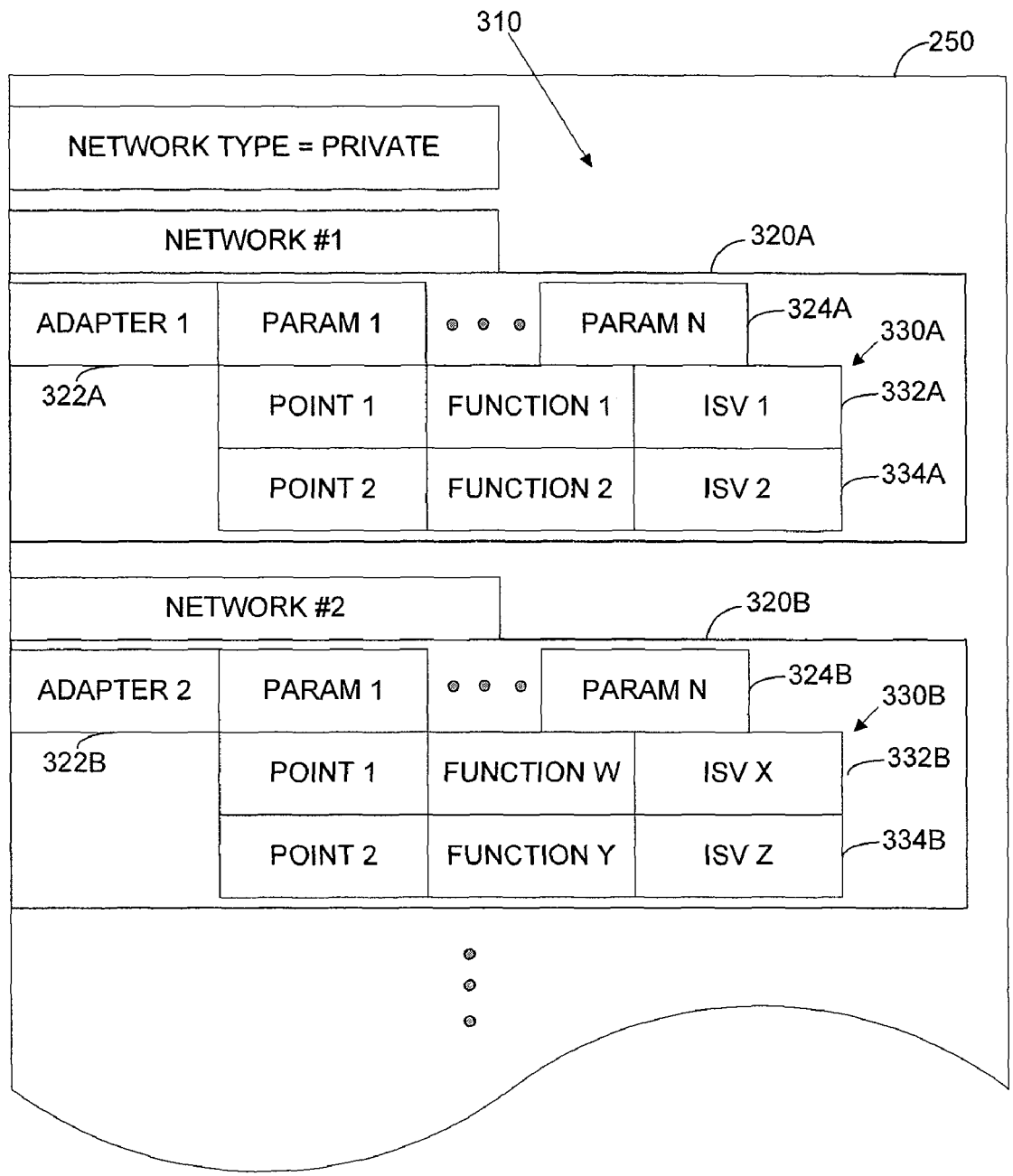
FIG. 3 is a sketch of a profile store according to some exemplary embodiments of the invention.

Turning to FIG. 3, additional details of an illustrative embodiment of profile store 250 are provided. In the example illustrated, profile store 250 may contain multiple sections, each containing information about network connections established in a different environment. For example, computer 110 may contain separate profile information for networks that are identified as "private" networks and networks identified as "public" networks. FIG. 3 illustrates section 310 of profile store 250. Section 310 stores profile information for networks of the "private" type. Profile store 250 may contain other sections (not shown) containing different or additional information for "public" networks or networks of any other suitable type. Though, it should be appreciated that the organization of information in profile store 250 is not critical to the invention, and profile information relating to a network connection may be stored in any suitable way, such as by organizing profiles based on network adapters with which they are associated.

FIG. 3 shows information stored concerning two network connections. This information is stored in regions 320A and 320B. Two such regions are shown for simplicity, but profile store 250 may store information concerning any suitable number of network connections.

As illustrated, region 320A stores information concerning a network connection identified as "Network #1" and region 320B stores information about a network connection identified as "Network #2." The information stored about each network may include information contained within a profile store as is known in the art for configuring a network connection in accordance with a standard protocol. In the example of FIG. 3, information may be stored in one or more data fields in each of the regions 320A and 320B. For example, fields 322A and 322B store an identification of an adapter used in forming the network connection. Each region 320A and 320B may include one or more fields in a list 324A or 324B providing parameters for configuring the adapter for the specific network connection. The parameters in lists 324A and 324B may have values selected using conventional techniques for configuring a network adapter.

Each of the regions 320A and 320B may additionally include information for configuring the extensibility points that may be present in the networking framework. As described above, extensibility points may be incorporated into the control path, the data path, or at any other suitable locations within a networking framework. Regardless of the locations of these extensibility points, they may be configured based on information in profile store 250. In the example of FIG. 3, information to configure the extensibility points is stored in lists associated with each of the regions 320A or 320B. Region 320A is shown to contain list 330A and region 320B contains list 330B. Each element in the list may define a function to be performed at an extensibility point. For example, list element 332A defines a function to be performed at extensibility point 1 and list element 334A defines a function to be performed at extensibility point 2 when the networking framework is configured to establish a connection with Network #1. Similarly, list elements 332B and 334B define extensibility functions to be performed at extensibility points 1 and 2, respectively, when the networking framework is configured for a connection for Network #2. The specific information defining the function to be performed at each extensibility point may be represented in any suitable way. For example, FIG. 3 illustrates that each list element includes a field identifying a function and a plug-in that may provide that function. However, any suitable format may be used to store the information.

Figure 4:
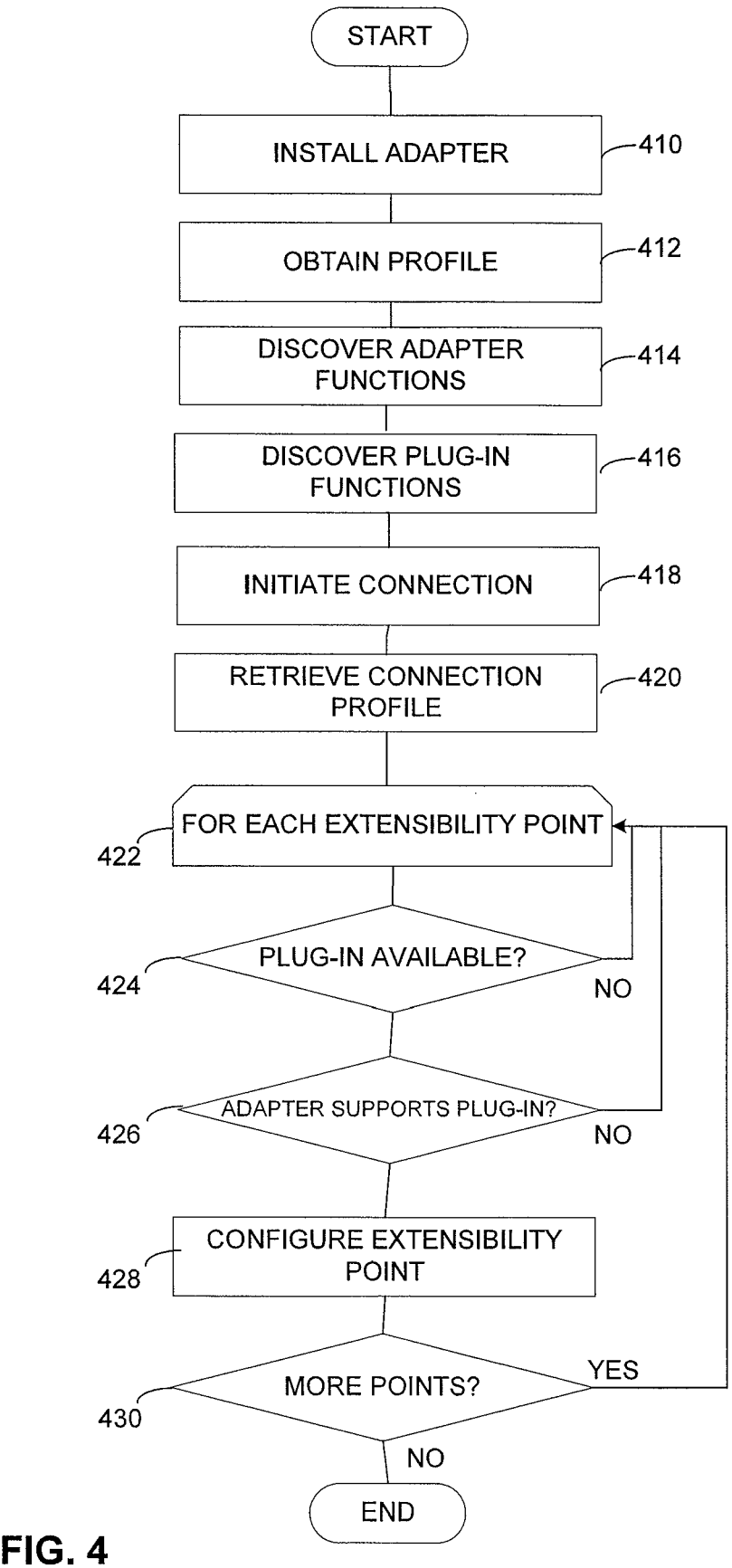
FIG. 4 is a flowchart of a process of configuring the network framework of FIGS. 2A, 2B, and 2C.

FIG. 4 illustrates a process by which the information in profile store 250 may be applied within the networking framework illustrated in FIGS. 2A, 2B, and 2C. The process of FIG. 4 begins at block 410 where a network adapter is installed. Installation of a network adapter may be performed using techniques as known in the art. In this example, installation of a network adapter acts as a trigger event to initiate configuration of a network connection. However, any suitable trigger event may be used to initiate configuration of a network connection to include extensibility functions according to embodiments of the invention.

Regardless of the trigger event that initiates configuration, the process may proceed to block 412. At block 412 profile information for a network connection may be obtained in any suitable way. For example, profile information may be obtained from a group policy agent, input by a user, or obtained in association with software installed on computer 110. Regardless of the manner in which profile information is obtained, in the embodiment illustrated, that profile information is stored in profile store 250.

The process may then proceed to blocks 414 and 416, where information concerning the capabilities of the computer to support extensibility functions may be determined. This processing, though shown to follow processing at block 412, may be performed in advance of processing at block 412 or at any other suitable time. Regardless of when the processing at block 414 is performed, that processing discovers extensibility functions supported by the adapter installed at block 410. As described above, an adapter supporting extensibility functions may expose a discovery interface, allowing other components of the networking framework to discover the extensibility functions supported by that adapter. In such an embodiment, the processing at block 414 may involve querying the adapter through the discovery interface. However, as illustrated in FIG. 2C, a component of the networking framework, such as NDIS arbitrator 290, may query the discovery interface and store information on supported extensibility functions. In such an embodiment, processing at block 414 may involve retrieving information from NDIS arbitrator component 290, or other component that stores extensibility information concerning adapters.

At block 416, capabilities of plug-ins to support extensibility functions are also determined. Information identifying supported extensibility functions may be obtained by interfacing directly to the plug-ins. Alternatively, the information may be obtained from a component that has previously obtained and stored the information. In the embodiment of FIG. 2C, such information is stored in plug-in registration module 294. Accordingly, processing at block 416 may entail obtaining information about supported extensibility functions from plug-in registration module 294 or other suitable module that has obtained and stored the information.

At block 418, a network connection is initiated. A network connection may be initiated in any suitable way. For example, information entered by a user through a user interface presented by user interface component 282 may initiate the network connection. However, the network connection may be initiated in any suitable way.

At block 420, information concerning the connection to be initiated is retrieved from profile store 250. Processing as is known in the art may be used to identify the specific connection for which profile information is to be obtained. Likewise, information may be accessed from profile store 250 using processing as is known in the art. Information in profile store 250 for configuring an adapter as is known in the art may be applied using known techniques. Information in profile store 250 defining configurations associated with extensibility points may then be processed.

Processing of information on extensibility points may begin at loop start 422. Each extensibility point for which information is stored in profile store 250 in conjunction with the selected network connection may be processed. That processing may include decision block 424.

At decision block 424, the process branches, depending on whether a plug-in is available to perform the function indicated at the extensibility point. A determination of whether a plug-in is available may be made based on information obtained at block 416. If a suitable plug-in is not available, the process may loop back to loop start 422, where the next extensibility point is processed. If a suitable plug-in is not available to execute the indicated function, the process loops back without the extensibility point being programmed to perform an extensibility function.

If a plug-in is available, the process proceeds to decision block 426. At decision block 426, the process may branch, depending on whether the extensibility function of the plug-in indicated for the extensibility point is supported by an available adapter. The determination at decision block 426 may be based on information obtained at block 414. If a suitable adapter is not available, the process loops back to loop start 422, where the next extensibility point is processed. When the process loops back in this fashion, the extensibility point is not programmed to perform an extensibility function.

However, if a plug-in and/or an adapter used to provide an extensibility function are available, the process proceeds to block 428 where the extensibility point is configured. The extensibility point may be configured in any suitable way to execute the extensibility function identified in profile store 250 when processing reaches the extensibility point.

The process then proceeds to decision block 430. If more extensibility points identified in profile store 250 remain to be configured, the process loops back to loop start 422. Conversely, when no more points remain to be configured, the process ends.

Figure 5:
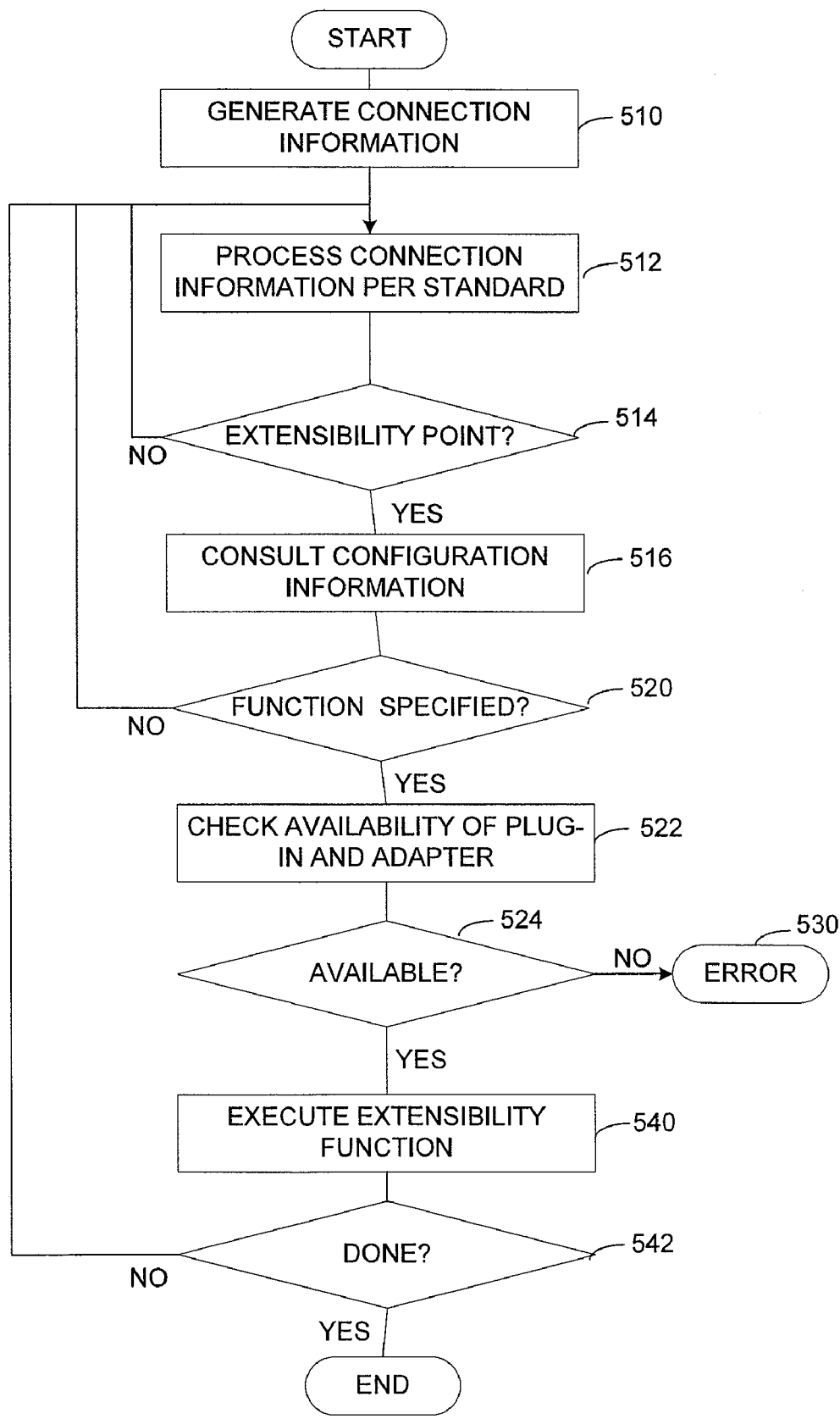
FIG. 5 is a flowchart of one aspect of the operation of the framework of FIGS. 2A, 2B, and 2C.

FIG. 5 illustrates a process of operating a computer with a networking framework configured to perform extensibility functions at one or more extensibility points as indicated in FIG. 4. The processing of FIG. 5 begins at block 510 where connection information is generated. Connection information 510 may represent any information that may be generated in processing either control information or data in a network connection. For example, the connection information may be initiated within services and user interfaces 262 (FIG. 2C), by configuration module 228 (FIG. 2A) or by action of adapter 234, or in any other suitable way.

Regardless of how the connection information is generated, at block 512 the connection information will be processed according to the standard networking framework. Processing of the connection information will be performed according to the standard networking connection framework until an extensibility point is reached.

Accordingly, FIG. 5 illustrates the process branching from decision block 514 back to block 512 when processing of the connection information has not reached an extensibility point.

However, when processing of the connection information reaches an extensibility point, the process branches from decision block 514 to block 516. At block 516 configuration information for the extensibility point is consulted. The configuration information may be the information stored at block 428 (FIG. 4). If the configuration information does not identify an extensibility function for the extensibility point encountered at decision block 514, the process loops back from decision block 520 to block 512, where processing of the connection information in accordance with the standard continues. However, when the configuration information identifies an extensibility function, the process branches from decision block 520 to block 522. At block 522, a check may be made of whether a plug-in and/or adapter used in execution of the specified function is available. If not, the process may branch from decision block 524 to error termination point 530. At error termination point 530, any suitable error processing may be performed, including logging an error or notifying a user of computer 110 of an error.

If no error occurs, processing continues from decision block 524 to block 540. At block 540, the identified extensibility function is executed. As described above, if an extensibility function is executed based on execution of a plug-in, such as plug-in 246 and 248, processing at block 540 may entail accessing the plug-in through a defined interface. However, any suitable mechanism for invoking an extensibility function may be used for processing at block 540.

Once the extensibility function is executed, processing proceeds to decision block 542. If processing of the connection information is complete, the process terminates. Conversely, if further processing remains, the process of FIG. 5 may loop back to block 512. When the process loops back to block 512, further processing of the connection information may be performed in accordance with standard networking framework operations until the next extensibility point is reached. Processing may continue in this fashion, with standard processing interspersed with selective execution of extensibility functions until processing of the connection information is completed.

Processing at block 512 may entail use of any standard components, including services and user interfaces. In this way, even though the networking framework has been configured for processing according to a non-standard protocol, the computer may present a user experience familiar to users based on prior experience with standard protocols. Moreover, ISVs or IHVs that wish to configure computer 110 to operate according to a non-standard protocol can take advantage of elements within the networking framework included for processing in accordance with a standard. In this way, the complexity of implementing a non-standard protocol is reduced, which may in turn encourage ISVs and IHVs to provide components that support functions desired by users.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer storage device having computer-executable modules, the modules comprising:
    a profile store for maintaining a profile for each of a plurality of network connections, at least a portion or the profiles comprising extensibility functions;
    a plug-in registry for storing identification of extensibility functions provided by network plug-in components; and
    at least one networking software module having at least one extensibility point, and performing networking operation associated with a connection over a network; and
    an extensibility module, during execution of the networking software associated with the network connection, selectively initiating action by a networking plug-in component at the extensibility point, the networking plug-in being selected based on information in the profile store for the connection.

2. The computer storage medium of claim 1, wherein the extensibility module provides a first communication path and a second communication path between a networking plug-in component and a network adapter, the first communication path communicating command objects according to an interface standard and the second communication path communicating non-standard command objects.

3. The computer storage medium of claim 2, wherein the first communication path comprises an NDIS interface.

4. The computer storage medium of claim 3, wherein the second communication path comprises a path for communicating a set of non-NDIS command objects, the set comprising a connect command object and a disconnect command object.

5. The computer storage medium of claim 1, wherein the at least one networking software module comprises a TCP/IP stack.

6. The computer storage medium of claim 5, wherein the networking software has a control portion and a data portion, and the at least one networking software module is in the control portion.

7. The computer storage medium of claim 6, wherein the at least one networking software module comprises networking software for implementing network communication over an Ethernet connection.

8. A method of operating a computer configured with components to implement a standard protocol to implement a standard and/or non-standard protocol, the method comprising:
    configuring the computer to implement the non-standard protocol, the configuring comprising:
        installing a module for executing at least one function of the non-standard protocol that differs from a function of the standard protocol;
        storing on the computer a connection profile identifying the at least one networking function associated with the non-standard protocol implemented in the module;
    processing information associated with a network connection using the non-standard protocol, the processing comprising:
        processing the information within a portion of the components to implement the standard protocol;
        at a point in the processing within the components to implement the standard protocol, the point being identified by the connection profile, processing the information within the module for executing at least one function.

9. The method of claim 8, wherein the processing information comprises processing command or status information.

10. The method of claim 9, wherein:
    processing the command or status information within a portion of the components to implement the standard protocol comprises passing a standard command object through an NDIS interface; and
    processing the information within the module for executing at least one function comprises generating a private command object.

11. The method of claim 10, wherein the method further comprises displaying information associated with the non-standard protocol through an interface module identified by the module.

12. The method of claim 8, wherein the process information comprises processing data packets.

13. The method of claim 12, wherein the processing data packets within the portion of the components to implement the standard protocol comprises processing the data packets within a TCP/IP stack.

14. The method of claim 13, wherein the process information comprises 802.3 data packets.

15. A computer system comprising:
a device;
an operating system, comprising a networking component, the networking component comprising:
at least one extensibility point;
at least one extensibility interface; and
at least one standardized device interface;
an adapter for the device interfacing to the operating system through the standardized device interface;
a plug-in for implementing a non-standard networking function, the plug-in interfacing to the operating system through the extensibility interface;
a profile store identifying operating characteristics of a network connection, the profile store identifying the device adapter and the plug-in and the at least one extensibility point,
wherein the networking component of the operating system interfaces to the plug-in at the at least one extensibility point during performance of a network operation associated with the connection.

16. The computer system of claim 15, wherein the plug-in is provided by an independent software vendor and the device and adapter are supplied by an independent hardware vendor.

17. The computer system of claim 16, wherein the standardized device interface comprises an NDIS interface.

18. The computer system of claim 17, wherein the plug-in is adapted to issue at a non-standard set of commands to the adapter, the set of commands comprising connect and disconnect commands.

19. The computer system of claim 18, further comprising a first component for displaying a user interface relating to Ethernet connections, the first component adapted to display a first type of information about the connection, and a second interface, for displaying a second type of information about the connection.

20. The computer system of claim 19, wherein the plug-in is adapted to interact with the operating system to provide an Ethernet-like user experience to a user of the computer in association with the connection, the connection using a protocol different than the Ethernet protocol.

* * * * *